(No Model.)
T. S. MOODIE.
HARNESS ATTACHMENT.
No. 475,282. Patented May 17, 1892.
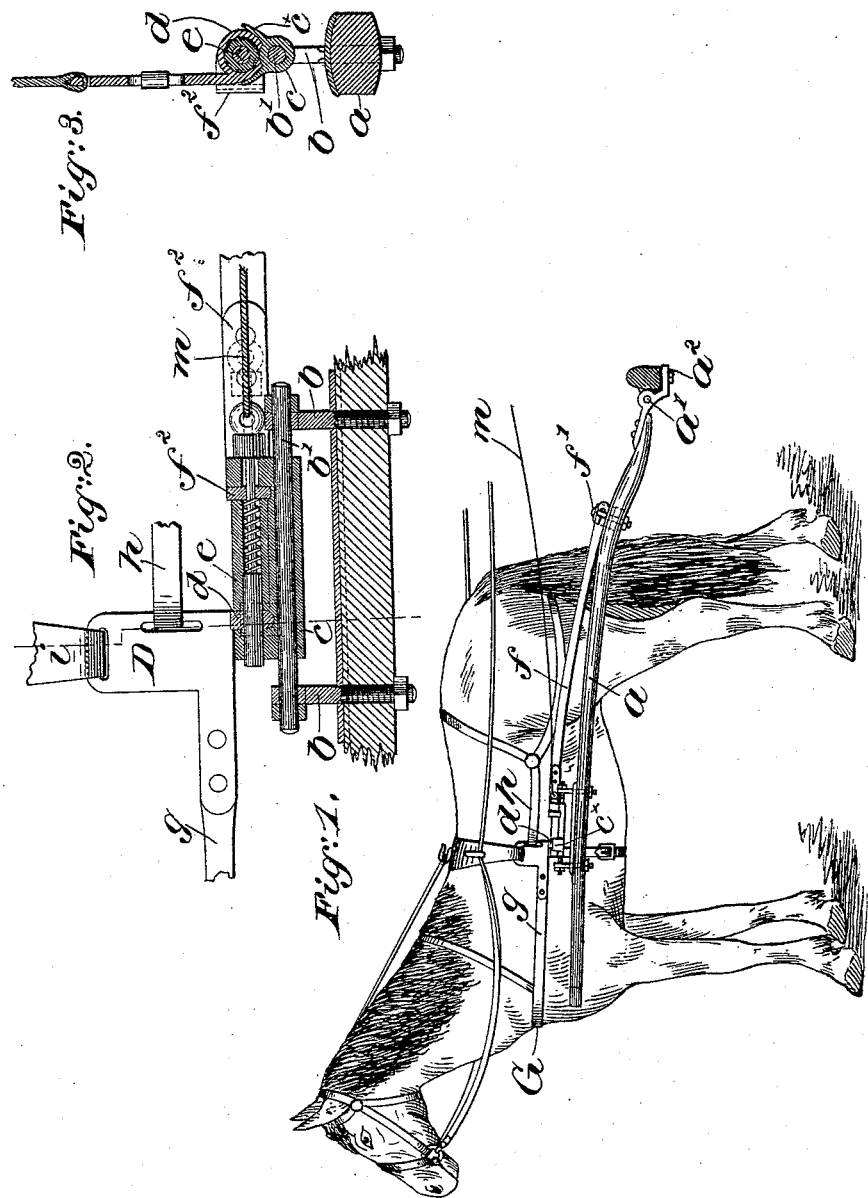
Witnesses.
Fred W. Ashworth
Edward F. Allen.
Inventor:
Thomas S. Moodie.
By Crosby & Gregory
Attys.

UNITED STATES PATENT OFFICE.

THOMAS S. MOODIE, OF SOUTH WALPOLE, MASSACHUSETTS.

HARNESS ATTACHMENT.

SPECIFICATION forming part of Letters Patent No. 475,282, dated May 17, 1892.

Application filed November 21, 1891. Serial No. 412,647. (No model.)

*To all whom it may concern:*

Be it known that I, THOMAS S. MOODIE, of South Walpole, county of Norfolk, State of Massachusetts, have invented an Improvement in Harness Attachments, of which the following description, in connection with the accompanying drawings, is a specification, like letters on the drawings representing like parts.

This invention has for its object to provide an improved harness attachment whereby a horse may be more readily attached to or released from a vehicle.

In accordance with this invention the tugs or traces may be permanently attached to the whiffletree; but at their forward ends said tugs or traces are detachably connected with the hames or breast-plate, from which they are disconnected to free the horse from the vehicle. Means are provided whereby the connection between the tugs and the breast-plate or hames may be severed by the driver from the vehicle. These and other features of this invention will be hereinafter fully described, and pointed out in the claims.

Figure 1 of the drawings represents a sufficient portion of a vehicle and harness to enable my invention to be understood; Fig. 2, an enlarged sectional view of the detachable connection to be referred to, and Fig. 3 a cross-section of the same on the dotted line $xx$.

Referring to the drawings, each of the usual shafts $a$ of a vehicle at or near its outer end has secured to it two posts $b$, connected by the rod $b'$, on which a movable member (herein shown as a sleeve $c$) is fitted to slide. Each sleeve $c$ at its upper side is recessed to receive an ear $d$ on a plate D, a sliding spring-controlled bolt $e$ in the upper portion of the sleeve (see Fig. 2) passing through the eye in the ear $d$ to lock the plate D securely to the sleeve $c$. Each tug or trace $f$ may, if desired, be permanently attached to the whiffletree $f'$; but at its forward end the said tug or trace is attached to the sleeve $c$ either directly or through the medium of the angle-iron $f^2$, as herein shown, said angle-iron fitting into a suitable recess in the upper portion of the sleeve $c$ and having an eye, through which is passed the spring-controlled bolt $e$.

The plates D, of which there are two, one upon each side of the horse, have attached to their front ends, as represented, the straps $g$, leading to the breast-plate G; or said straps may lead to the hames, if such are employed, instead of the breast-plate, while the pull-back-straps $h$ are attached to the back sides of the plates D, being thereby connected with the pulling-straps $g'$, as represented in Fig. 1. The saddle straps or girths $i$ are herein represented as passed through or attached to the plates D to hold the same in position.

From the foregoing it will be seen that the pull of the horse when exerted upon the straps $g$ is transmitted through the sleeves $c$ and tugs $f$ to the whiffletree $f'$, the sleeves $c$ being made shorter than the distance between the posts $b\ b$, in order to permit the sleeves to slide back and forth on the rods $b'$ with the tugs and whiffletree as the same are moved by the horse in drawing the vehicle. When backing, the pull is transmitted through the pullbacks $h$ to the sleeves $c$ on the shafts, as in harness at the present time.

To release the horse from the vehicle it is only necessary to draw the spring-controlled bolts $e$ back into their dotted-line positions, Fig. 2, to withdraw them from the eyes in the ears $d$, and thereby disconnect the plates D from the sleeves $c$ and from the shafts to which they are attached.

In cases of emergency, as when the horse is beyond control, the release may be effected from the vehicle by means of a cord $m$, connected at its opposite ends with the bolts $e$ and extending back to the vehicle within reach of the driver, who by pulling the cord will withdraw both the bolts $e$ at the same time and release the horse from the vehicle. In such cases it is desirable to prevent the shafts $a$ from dropping to the ground, and I have therefore provided the thills $a'$ of the shafts with ears $a^2$, which lie under the front axle of the vehicle and which, when the shafts are released from the horse, will come in contact with the said axle and retain the shafts in an elevated position.

With the above-described device the horse pulls from the whiffletree and when backing pulls from the shafts, as in the usual harness.

Each sleeve $c$, as herein represented, is provided with lateral lips $c^x$ to guide the ear $d$ on the plate D into proper position to permit the bolt $e$ to enter, while the periphery of the ear $d$ is also rounded or sharpened, as represented, to further assist in coupling the plate D to the sleeve $c$.

I have herein described and claimed the tugs as attached to the whiffletree $f$; but I include in this use of the term "whiffletree" any other means for attaching the tugs at the back of or behind the horse in contradistinction to devices wherein the forward pull by the horse is applied to the outer ends of the shafts, it being much easier on the horse to pull from behind, as in the ordinary harness in general use.

I claim—

1. The shafts, the sliding sleeves $c$, offset from said shafts and permanently secured thereto and having the spring-controlled bolts $e$, a whiffletree, and independent tugs connecting the same with each of said sleeves, combined with plates detachably connected with said sleeves by said bolts, pulling-straps and pullback-straps connected with the plates, and a cord attached to said bolts, to operate substantially as described.

2. The shafts, the sliding sleeves $c$, permanently secured thereto and provided with the ear-guiding lips $c^\times$, a recess in each sleeve and spring-controlled bolts $e$ extended across said recess, a whiffletree, and independent tugs connecting the same with said sleeves, combined with plates having ears to enter said recesses and through which said bolts are passed to attach said plates to said sleeves, pulling-straps and pullback-straps connected with said plates, and a cord to move said bolts, substantially as described.

In testimony whereof I have signed my name to this specification in the presence of two subscribing witnesses.

THOMAS S. MOODIE.

Witnesses:
ETTA M. CARPENTER,
FRANK C. CARPENTER.